(12) United States Patent
Wyhler et al.

(10) Patent No.: US 8,584,868 B2
(45) Date of Patent: Nov. 19, 2013

(54) FILTER MEDIUM AND FILTER ELEMENT

(75) Inventors: Heiko Wyhler, Stuttgart (DE); Jochen Reyinger, Waiblingen (DE); Klaus Gehwolf, Mamming (DE)

(73) Assignee: Mann+Hummel GmbH, Ludwigsburg (DE)

( * ) Notice: Subject to any disclaimer, the term of this patent is extended or adjusted under 35 U.S.C. 154(b) by 0 days.

(21) Appl. No.: 13/235,361

(22) Filed: Sep. 17, 2011

(65) Prior Publication Data

US 2012/0024774 A1    Feb. 2, 2012

Related U.S. Application Data

(63) Continuation of application No. PCT/EP2010/053428, filed on Mar. 17, 2010.

(51) Int. Cl.
| | | |
|---|---|---|
| *B01D 27/00* | (2006.01) | |
| *B01D 29/07* | (2006.01) | |
| *B01D 29/31* | (2006.01) | |
| *B01D 39/00* | (2006.01) | |
| *B01D 35/00* | (2006.01) | |
| *B01D 27/06* | (2006.01) | |

(52) U.S. Cl.
USPC ........... 210/483; 210/484; 210/485; 210/488; 210/489; 210/490; 210/492; 210/493.1; 210/493.2

(58) Field of Classification Search
None
See application file for complete search history.

(56) References Cited

U.S. PATENT DOCUMENTS

| 3,592,767 A * | 7/1971 | Pall ............................... 210/490 |
| 2001/0045086 A1 | 11/2001 | Cox |
| 2004/0245169 A1 | 12/2004 | Breusch |
| 2005/0269256 A1 * | 12/2005 | Haq et al. ..................... 210/490 |
| 2006/0107639 A1 | 5/2006 | Hamlin |
| 2007/0102101 A1 | 5/2007 | Spearin |
| 2008/0105626 A1 | 5/2008 | Jones |

FOREIGN PATENT DOCUMENTS

| WO | WO0062899 A1 | 10/2000 |
| WO | WO03/033100 A1 | 4/2003 |
| WO | WO2009088647 A1 | 7/2009 |

OTHER PUBLICATIONS

DelStar Technologies, Inc., Engineering Thermoplastic Solutions, (C) 2009.*
DPMA search report DE 20 2009 003 669.3.

* cited by examiner

*Primary Examiner* — Benjamin Kurtz
(74) *Attorney, Agent, or Firm* — James Hasselbeck

(57) ABSTRACT

A filter medium for removing particles from a fluid flow has a pre-filter layer and a fine-filter layer joined to each other in the flow direction. A first supporting layer is attached to the unfiltered side of the pre-filter layer and a second supporting layer is attached to the filtered side of the fine-filter layer in order to absorb the longitudinal and transverse forces in the event of tensile loading. The traverse force absorbing layer has a greater bending stiffness in a traverse direction while the longitudinal force absorbing layer has a greater bending stiffness in a longitudinal direction.

20 Claims, 3 Drawing Sheets

FILTER MEDIUM AND FILTER ELEMENT

CROSS REFERENCE TO RELATED APPLICATIONS

This application is a bypass continuation application of international application No. PCT/EP2010/053428 having an international filing date of Mar. 17, 2010 and designating the United States, the International Application claiming a priority date of Mar. 17, 2009 based on prior filed German patent application No. 20 2009 003 669.3, the entire contents of the aforesaid international application being incorporated herein by reference.

TECHNICAL FIELD

The invention concerns generally a filter medium and a filter element, especially for fluids, as well as a method for producing a zigzag-shaped folded filter medium. Especially, the invention concerns a multi-layer filter medium and a filter element for use in fuel filtration.

BACKGROUND OF THE INVENTION

It is known that in conventional filter elements different filter material is combined for generating a filter behavior that is optimal for the particles to be filtered out and the fluid passing through. For example, DE 44 43 156 A1 in itself discloses the use of a meltblown as a filter medium in a gas stream together with a support material that serves exclusively a stabilization purpose.

Moreover, WO 96/34673 discloses in connection with a hollow-cylindrical filter element the arrangement of several filter layers of a meltblown on a support layer. The layers then form together an exchangeable filter element that is insertable into a filter arrangement.

U.S. Pat. No. 5,496,627 and WO 95/17946 disclose sequentially arranged nonwoven filter elements of synthetic fibers with stepped filter fineness wherein here the filter fineness of the filter layers increases in the flow direction.

Moreover, U.S. Pat. No. 5,427,597 and WO 96/34673 disclose that several filter layers or only a single filter layer of a nonwoven produced by a meltblowing method are arranged on a support layer that serves substantially as a stabilizing means. The filtering action of the support layer is neglectable in comparison to the other layers in this connection.

Finally, U.S. 2007/0289920 A1 discloses a filter arrangement with a filter medium that contains a plurality of layers of a spunbond nonwoven with continuous fibers. In addition, at least one inwardly positioned layer of meltblown fibers is provided between the outer spunbond layers.

The invention has the object to provide a multi-layer fully synthetic filter medium with a gradient structure that in addition to a very high degree of separation also is distinguished by very high dirt absorption and a minimal constructive size.

SUMMARY OF THE INVENTION

The present invention solves this object by providing a filter medium and a filter element for removing particles from a fluid flow, in particular of particles from a fuel flow in an internal combustion engine, wherein in the flow-through direction a prefilter layer and a fine filter layer are joined and wherein at the unfiltered side of the prefilter layer a first support layer and at the filtered side of the fine filter layer a second support layer are attached for absorbing the longitudinal or transverse tensile and compressive (pressure) forces in the event of tensile loading and/or pressure loading. In this connection, the two support layers each have different strengths, in particular tensile strengths, preferably specified as average maximum tensile forces in longitudinal or transverse direction. The two support layers preferably have different stiffness and elasticity in the longitudinal or traverse directions. In preferred embodiments the traverse force absorbing layer has a greater bending stiffness in a traverse direction while the longitudinal force absorbing layer has a greater bending stiffness in a longitudinal direction.

The invention concerns moreover a filter element for removal of particles from a fluid flow, in particular of particles of a fuel flow of an internal combustion engine, comprising a first end disk, in particular of injection-molded plastic material, a second end disk, in particular of injection-molded plastic material, and a filter medium arranged between the end disks, glued or fused thereto, and folded in a star shape.

The invention concerns moreover a method for producing a zigzag-shaped folded filter medium, in particular for use in a filter element according to the invention.

In one embodiment of the filter medium according to the invention, in the flow-through direction a prefilter layer and a fine filter layer are joined wherein at the unfiltered side of the prefilter layer a first support layer and at the filtered side of the fine filter layer a second support layer are attached for absorbing the longitudinal or transverse forces upon tensile or pressure loading wherein the two support layers each have different average maximum tensile forces in longitudinal or transverse direction. Therefore, the direction in which the filter medium, that is in particular web-shaped and preferably rectangular, has its greatest length, in particular, the advancing direction during manufacture of the filter medium, is defined as longitudinal direction. The direction that extends perpendicularly to the longitudinal direction across the width of the filter medium and along which the filter medium is preferably folded is defined as transverse direction.

The different strengths (tensile and pressure), different stiffnesses and elasticities of the two support layers have the advantage that with them in longitudinal and transverse direction the length difference of the outer layers about the neutral layer at the center in case of possible deflections during the lamination, roll-cutting, embossment, and erection processes is compensated and therefore the processability is improved or even enabled in case of certain media configurations. The necessary stiffness for connecting the folded bellows and the end disk of the filter element that is required when fusing the filter medium with a thermoplastic end disk or upon immersing the filter medium into a viscous adhesive is advantageously achieved by the support layer for absorbing transverse forces.

Moreover, the support layers in appropriate embodiments can advantageously fulfill the function of drainage in order to prevent sticking together of the filter medium. In this connection, a further advantage of the support layers resides in the possibility to move the folds until "locked" because flow-through is ensured as a result of the support layers thus resting against each other.

In measurements for determining properties under tensile load, in general the width-related breaking force is determined, separate for the machine direction (longitudinal direction) and the transverse direction, according to DIN EN ISO 1924-2 based on the following equation:

$$\sigma_T^b = \frac{\overline{F}_t}{b}$$

wherein $\overline{F}_t$ indicates the average value of the maximum tensile force in Newton and b indicates the initial width of the sample in millimeters. According to standard, b=15 mm and the length of the sample is at least 180 mm. For determining the average maximum tensile force, at least ten tensile tests are required. In the following, as a material parameter the average value of the maximum tensile force $\overline{F}_t$ in Newton is provided. Since according to standard the width b of 15 mm is defined as a fixed test parameter, the width-related breaking force can be calculated based on it at any time.

As a further material parameter, in the following the width-related bending stiffness S determined according to DIN 53121 is used. The standard provides various measuring procedures; preferably, a rectangular sample with the width b is clamped along a width and, at a spacing I from the clamping location, is loaded with a force F so that a maximum bending action f as a shift of the point of attack of the force result. The width-related bending stiffness S is calculated based thereon as follows:

$$S = \frac{F}{f} * \frac{l^3}{3b}.$$

In one embodiment of the filter medium according to the invention the average maximum tensile force of the support layer that absorbs the transverse forces is greater than 10 N in the longitudinal direction.

In an advantageous embodiment, the average maximum tensile force of the support layer absorbing the transverse forces is greater than 20 N in the transverse direction.

In one embodiment, the average maximum tensile force of the support layer absorbing the longitudinal forces is greater than 20 N in the longitudinal direction.

In an advantageous embodiment, the average maximum tensile force of the support layer absorbing the longitudinal forces is greater than 10 N in the transverse direction.

In one embodiment, the width-related bending stiffness of the support layer absorbing the transverse forces is greater than 0.1 N mm, in particular greater than 0.15 N mm, in the longitudinal direction.

In one embodiment, the width-related bending stiffness of the support layer absorbing the transverse forces is greater than 0.3 N mm, especially preferred greater than 0.4 N mm, in the transverse direction.

In an advantageous embodiment, the width-related bending stiffness of the support layer absorbing the longitudinal forces is greater than 0.3 N mm, in particular greater than 0.45 N mm, in longitudinal direction.

In one embodiment, the width-related bending stiffness of the support layer absorbing the longitudinal forces is greater than 0.1 N mm, especially preferred greater than 0.15 N mm, in the transverse direction.

In one embodiment, at least one of the support layers is embodied in the form of a grid that has crossing threads wherein the crossing threads define a thread angle.

In one embodiment, the thread angle of the support layer that is responsible for absorbing the transverse forces is in the range of 70 degrees-120 degrees, preferably in the range of 80 degrees-100 degrees, especially preferred at 90 degrees.

In one embodiment, the thread angle of the support layer that is responsible for absorbing the longitudinal forces is in the range of 40 degrees-80 degrees, in particular in the range of 50 degrees-70 degrees.

In one embodiment, the prefilter layer is formed of a meltblown layer with a thickness in the range of 0.1 mm to 1 mm and a weight per surface area in the range of 40 g/m²-200 g/m².

In one embodiment, the thickness of the meltblown layer is between 0.2 mm and 0.4 mm and the weight per surface area between 90 g/m² and 110 g/m².

In one embodiment, the fiber diameter of the prefilter layer and/or of the fine filter layer is in the range of 0.1 µm to 10 µm.

In one embodiment, the prefilter layer and/or the fine filter layer are produced of materials, selected from the group consisting of polybutylene terephthalate (PBT) meltblown, polyamide (PA) meltblown, polypropylene (PP) meltblown, and polyether sulfone (PES) meltblown.

In one embodiment, the fine filter layer is formed of a meltblown layer with a thickness in the range of 0.5 mm to 1.5 mm and a weight per surface area in the range of 40 g/m²-200 g/m².

In one embodiment, the thickness of the meltblown layer is between 0.6 mm and 1.0 mm and the weight per surface area between 90 g/m² and 110 g/m².

In one embodiment, the filter medium comprises additionally a third filter layer.

In one embodiment, the third filter layer is formed of a meltblown layer with a thickness in the range of 0.1 mm to 1 mm and a weight per surface area in the range of 10 g/m²-100 g/m².

In one embodiment, the thickness of the meltblown layer is between 0.2 mm and 0.4 mm and the weight per surface area is between 30 g/m² and 60 g/m².

In one embodiment, the third filter layer is produced of materials selected from the group consisting of polybutylene terephthalate (PBT) meltblown, polyamide (PA) meltblown, polypropylene (PP) meltblown, and polyether sulfone (PES) meltblown.

In one embodiment, the fiber diameter of the third fiber layer is in the range of 0.1 µm to 10 µm.

In one embodiment, the third filter layer is embodied as an absolute separator.

In one embodiment, the filter layers and/or support layers are connectable to each other by means of a thermal calendar, ultrasound, powder or spray adhesive.

In one embodiment, the filter and/or support layers are loosely stacked on each other and only at the time of folding are then connected to each other.

In one embodiment, the support layers are in the form of a grid.

In one embodiment, the support layers are comprised of a combination selected from the group consisting of grid-spunbond, spunbond-spunbond, spunbond-filter layers, and grid-filter layers.

The invention concerns moreover a method for producing a zigzag-shaped folded filter medium in which a web-shaped multi-layer filter medium according to one of the above described embodiments, in which in particular the individual layers are loosely stacked on each other, is supplied by means of a supply device to a heat-introducing embossment unit, in particular an ultrasound embossment unit, that embosses folding lines into the filter medium, wherein the filter medium subsequently is folded along the folding lines by means of a folding device, wherein layers of the multi-layer filter medium are fused upon embossment along the folding lines by means of the heat-introducing embossment unit, in particular ultrasound embossment unit.

The invention concerns moreover a filter element for removal of particles from a fluid flow, in particular particles from a fuel flow of an internal combustion engine, comprising a first end disk with an inlet or outlet opening, a second end disk that is in particular centrally closed, and a star-shaped folded filter medium according to one of the above described embodiments arranged between the end disks, or a filter medium that is folded in a zigzag shape by means of the above described method.

In one embodiment of the filter element, the filter medium is thermally fused, in particular by infrared welding, to at least one of the end disks that are especially injection-molded from thermoplastic material.

In one embodiment of the filter element, the filter medium is glued to at least one of the end disks.

Further embodiments of the invention result from the claims and the description.

BRIEF DESCRIPTION OF THE DRAWINGS

The invention will be explained in the following in more detail with the aid of the drawings. It is shown in.

EMBODIMENT(S) OF THE INVENTION

Figure 1:
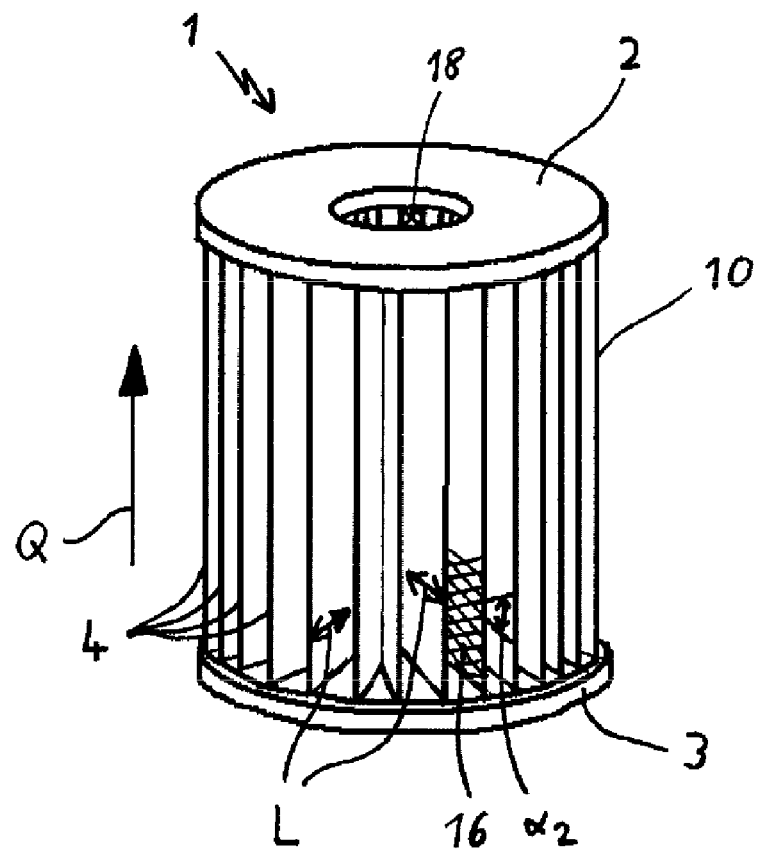
FIG. 1 a filter element according to the invention comprising a filter medium according to the invention.
Figure 2:
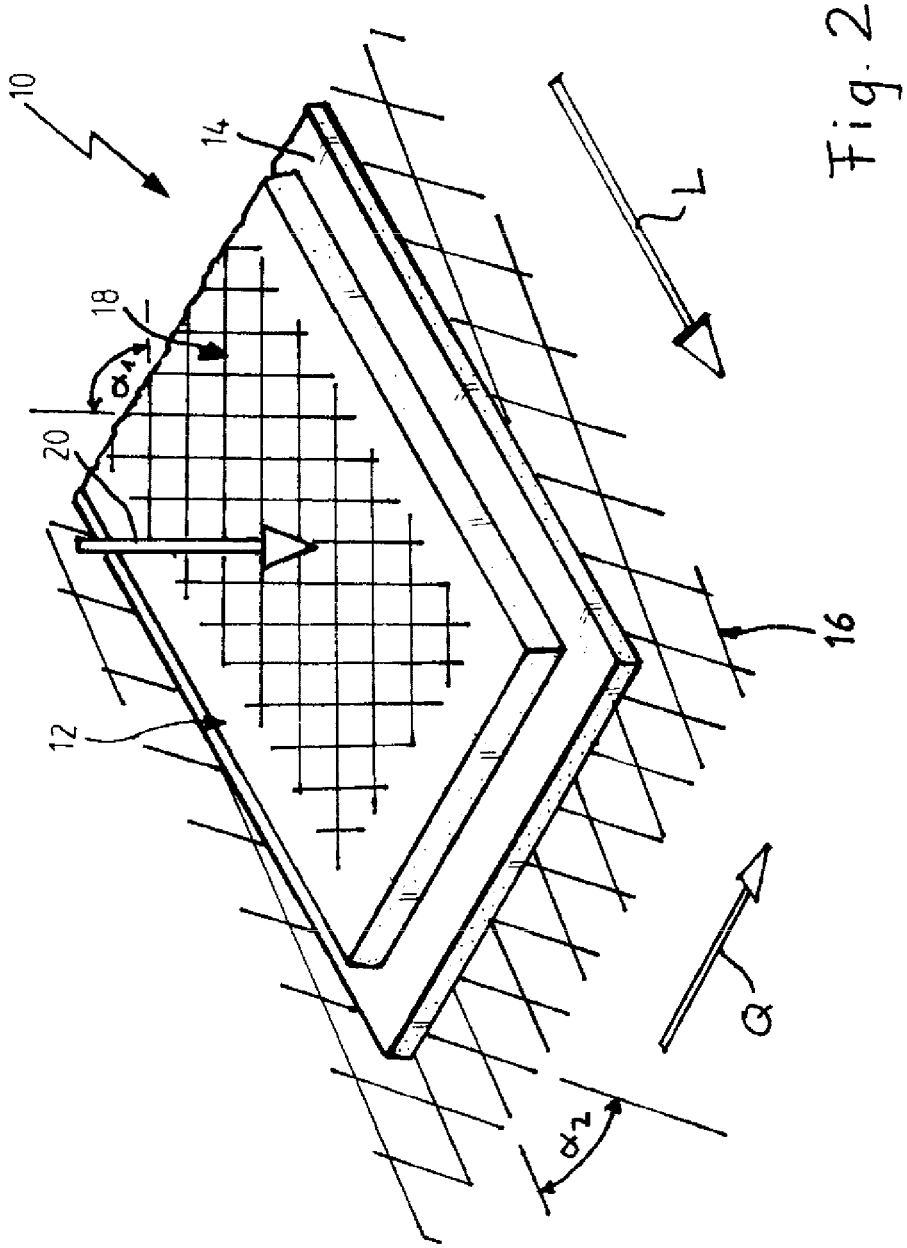
FIG. 2 the schematic configuration of a filter medium according to the invention.
Figure 3:
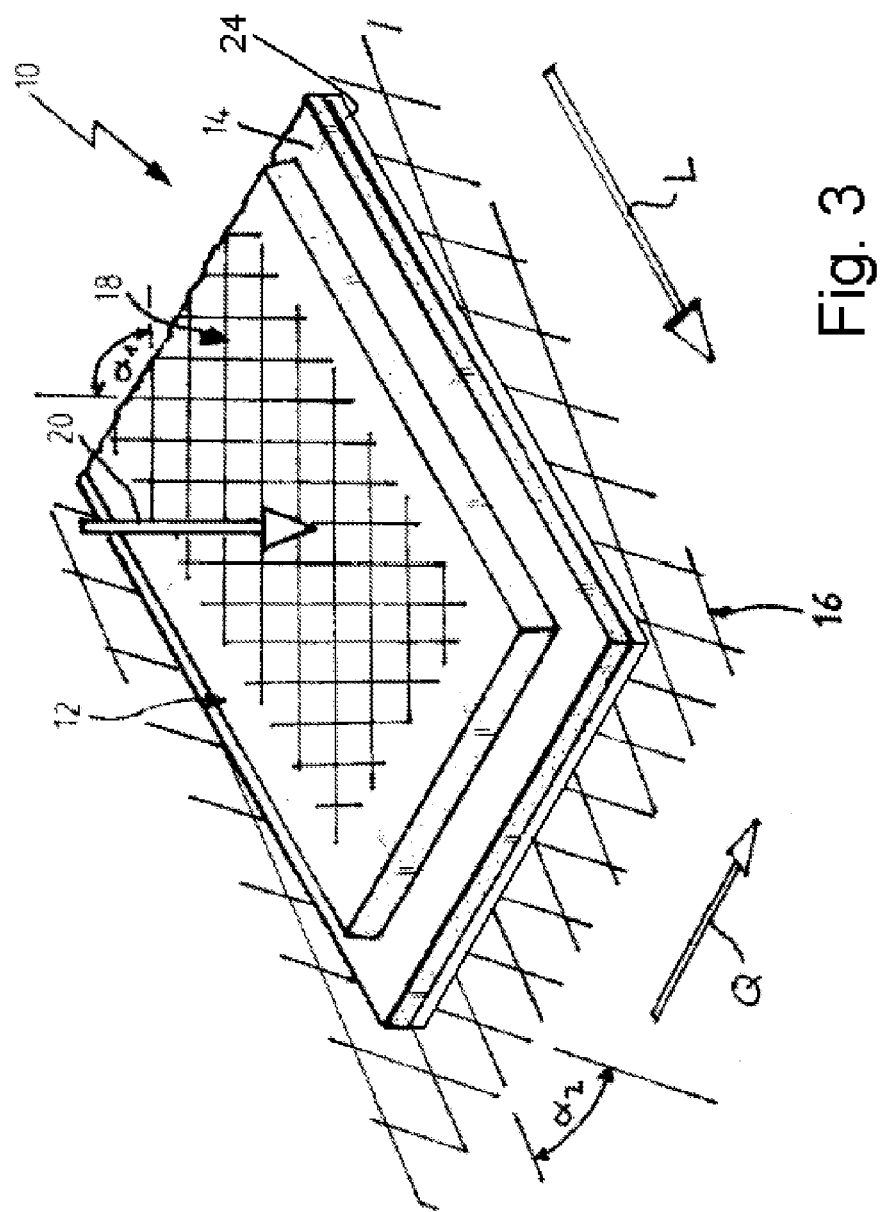
FIG. 3 the schematic configuration of a filter medium of FIG. 2 adding the third filtration layer.

FIG. 1 shows an embodiment of a filter element 1 according to the invention, comprising an upper end disk 2, a lower end disk 3, and an annular star-shaped folded filter medium 10 according to the invention that is arranged therebetween; its configuration corresponds in detail in particular to the embodiment illustrated in FIG. 2. In this embodiment, a first support layer 18 for absorbing the transverse forces is arranged on the inwardly oriented side of the filter medium 10 and, correspondingly, a second support layer 16 for absorbing the longitudinal forces is arranged on the outwardly oriented side of the filter medium 10. The transverse direction Q extends perpendicularly to the end disks 2, 3 and parallel to the fold edges 4 of the filter medium. The longitudinal direction L extends on the filter medium 10 at a right angle to the transverse direction Q. The second support layer 16 for absorbing the longitudinal forces is embodied as a grid which has a thread angle $\alpha_2$ of 40 degrees-80 degrees, in particular of 50 degrees-70 degrees, preferably 60 degrees. The first support layer 18 for absorbing the transverse forces is also embodied as a grid which has a thread angle $\alpha_1$ of 80 degrees-100 degrees, preferably 90 degrees. The thread angles $\alpha_1$ and $\alpha_2$ are advantageously oriented such that the longitudinal direction represents the bisecting line of the angle. The filter element can be flowed through from the exterior to the interior or in opposite direction. As an alternative to the arrangement of FIG. 1, the support layer 16 for absorbing of longitudinal forces can also be arranged inwardly and the support layer 18 for absorbing the transverse forces on the exterior side of the filter element.

FIG. 2 shows the schematic configuration of the filter medium 10 according to the invention wherein, viewed in the flow-through direction (see arrow 20), a prefilter layer 12 and a fine filter layer 14 are joined to each other and wherein at the unfiltered side of the prefilter layer 12 a first support layer 18 and at the filtered side of the fine filter layer 14 a second support layer 16 for absorbing the longitudinal or transverse forces are attached. The prefilter layer 12 is comprised in this connection preferably of a meltblown and is in particular formed of a meltblown selected from the group consisting of polybutylene terephthalate (PBT) meltblown, polyamide (PA) meltblown, polypropylene (PP) meltblown, and polyether sulfone (PES) meltblown. The thickness of the prefilter layer 12 is in the range of 0.1 mm to 1 mm, preferably between 0.2 mm and 0.4 mm, and the weight per surface area is between 40 $g/m^2$-200 $g/m^2$, preferably between 90 $g/m^2$ and 110 $g/m^2$. The fiber diameter is in the range of 0.1 to 10 μm.

Meltblown media are constructed on the basis of polyester and ensure thus a significantly longer service life than cellulose media. In comparison to single-layer cellulose media, the meltblown medium has two layers with gradient structure. By means of a meltblowing method very fine fibers are produced that enable in the finished filter medium a very large pore volume.

The fine filter layer 14 is comprised also of a meltblown and is in particular formed of a meltblown selected from the group consisting of polybutylene terephthalate (PBT) meltblown, polyamide (PA) meltblown, polypropylene (PP) meltblown, and polyether sulfone (PES) meltblown. The thickness of the fine filter layer 14 is in the range of 0.5 mm to 1.5 mm, preferably between 0.6 mm and 1.0 mm, and the weight per surface area is between 40 $g/m^2$-200 $g/m^2$, preferably between 90 $g/m^2$ and 110 $g/m^2$. The fiber diameter is in the range of 0.1 to 10 μm.

Optionally, the filter medium 10 can have in one embodiment a third filtration layer 24 that is formed as an absolute separator. This third filter layer can be comprised of a meltblown layer with a thickness in the range of 0.1 mm to 1 mm, in particular between 0.2 mm and 0.4 mm, and a weight per surface area in the range of 10 $g/m^2$-100 $g/m^2$, in particular between 30 $g/m^2$ and 60 $g/m^2$. The fiber diameter is in the range of 0.1 μm to 10 μm.

The support layers 16, 18 that are required for processing (stiffness/elasticity) are preferably in the form of a grid, in particular a plastic grid. The material of the support layers can also be comprised of a combination, selected from the group consisting of grid-spunbond, spunbond-spunbond, spunbond-filter layers, and grid-filter layers. The support layers can also be comprised of the filter medium itself.

The meltblown layers and the support layers of the filter medium 10 according to the invention can be connected to each other by means of thermal calendar, ultrasound, powder or spray adhesive. The support layers are preferably applied by means of adhesive (spray adhesive) onto the prefilter or fine filter layer.

The support layers are comprised of a polymer, in particular PBT, PA, PP, or PES whose thickness is in the range of 0.3-1.2 mm, especially between 0.4-0.7 mm, and whose weight per surface area is in the range of 50-200 $g/m^2$, in particular between 80 and 110 $g/m^2$.

In FIG. 2, the direction in which the filter medium during manufacture is advanced (advancing direction) is defined as longitudinal direction L, the transverse direction is accordingly perpendicular thereto. FIG. 2 shows furthermore the support layer (grid) 16 as absorbing means for the longitudinal forces and the support layer (grid) 18 as absorbing means for the transverse forces. It is apparent to a person of skill in the art that the grid 18 can also serve as absorbing means for the longitudinal forces and the grid 16 as absorbing means for transverse forces. The different average maximum tensile forces of the support layers (e.g. grid) in longitudinal and transverse direction compensate the length difference of the outer layers about the neutral layer at the center for possible deflections during lamination, roll-cutting, embossment and erecting processes and improve thus the processability or even makes it possible at all. The stiffness required for the connection of folded bellows and end disk of the filter element is achieved by the support layer for absorbing the transverse forces.

Moreover, the support layers fulfill the function of drainage for preventing the filter medium from sticking together. A further advantage of the support layers resides in the possibility to move the folds until "locked" because flow-through is ensured.

FIG. 2 shows the arrangement of the appropriate thread angle, i.e., the thread angle of the crossing threads of the support layers (grid) 16, 18. The grid 18 that is responsible for absorbing the transverse forces has a thread angle $\alpha_1$ in the range of 70 degrees-120 degrees, in particular 80 degrees-100 degrees, especially advantageously 90 degrees. It is advantageous that the grid 18 has an average maximum tensile force in the longitudinal direction of greater than 10 N and in transverse direction of greater than 20 N. Also, a width-related bending stiffness S (determined according to DIN 53121) in the longitudinal direction of greater than 0.1 N mm, especially greater than 0.15 N mm, and in transverse direction of greater than 0.3 N mm, especially greater than 0.4 N mm, is advantageous. The grid (16 in FIG. 1) that is responsible for absorbing the longitudinal forces has a thread angle $\alpha_2$ in the range of 40 degrees-80 degrees, in particular 50 degrees-70 degrees. In this connection, it is advantageous when the grid 16 has an average maximum tensile force in the longitudinal direction of greater than 20 N, especially greater than 25 N, and in the transverse direction of greater than 10 N, especially greater than 15 N. Also, a width-related bending stiffness in the longitudinal direction of greater than 0.3 N mm, in particular greater than 0.4 N mm, and in transverse direction of greater than 0.1 N mm, in particular greater than 0.15 N mm, is advantageous.

As already mentioned, the support layers of the filter medium can be comprised of a grid-spunbond, spunbond-spunbond, spunbond-filter medium or grid-filter medium combination. However, the flexibility for compensation of the length differences during the corresponding processing steps as a result of different longitudinal or transverse forces of the individual support layers must be ensured always.

In one embodiment, the filter medium is folded by means of a method according to the invention in a zigzag shape. According to the method of the invention, a multi-layer web-shaped filter medium is used that is folded to filter elements, wherein in the web-shaped filter medium in particular the individual layers are stacked loosely on each other, wherein the filter medium by means of a supply device is supplied to a heat-introducing embossment unit, in particular, an ultrasound embossment unit, that embosses folding lines into the filter medium, wherein the filter medium subsequently is folded along the folding lines by means of a folding device, wherein layers of the multi-layer filter medium during embossment are fused along the folding lines by means of the heat-introducing embossment unit, in particular an ultrasound embossment unit. In this connection, the layers of the multi-layer filter medium can have support layers, in particular plastic grids, wherein at least one of the layers may comprise a meltblown layer.

In an advantageous further embodiment of the method, the filter medium is embossed and fused by means of an anvil roll with embossment webs, an ultrasound-operated sonotrode, and an embossment stamp that in particular is formed at least partially by the sonotrode.

The invention claimed is:

1. A filter medium for removing particles from a fluid flow, in particular particles from a fuel flow of an internal combustion engine, comprising:
   a fine filter layer;
   a prefilter layer covering and joined to an upstream surface of said fine filter layer, said upstream surface relative to a flow-through direction of said filter medium;
   a first support layer arranged at and secured to a unfiltered side of said prefilter layer;
   a second support layer arranged at and secured to a filtered side of said fine filter layer,
   wherein said support layers are operable to absorb longitudinal or transverse forces under tensile or pressure loading of said layers,
   wherein one of said support layers is a transverse force absorbing layer having a greater bending stiffness in a transverse direction relative to the other support layer, and
   wherein the other one of said support layers is a longitudinal force absorbing layer having a greater bending stiffness in a longitudinal direction relative to the transverse force absorbing support layer,
   wherein the support layers are comprised of a polymer selected from the set: PBT, PA, PP or PES having a thickness between 0.3 to 1.2 mm and a weight per surface area in the range of 50 to 200 g/m2,
   wherein the filter layers and support layers are secured to each other by means of thermal calander, ultrasound, powder or spray adhesive,
   wherein at least one of the support layers is embodied in the form of a grid that has crossing threads,
   wherein the crossing threads define a thread angle between a first thread and a second thread crossing said first thread,
   wherein a first one of said support layers absorbing transverse forces is a grid having a thread angle of between 80 to 100 degrees,
   wherein a first one of said support layers absorbing longitudinal forces is a grid having a thread angle of between 40 to 80 degrees,
   wherein the longitudinal direction bisects the thread angle of the transverse force absorbing support layer,
   wherein the longitudinal direction bisects the thread angle of the longitudinal force absorbing support layer.

2. The filter medium according to claim 1, wherein
   a maximum average tensile force in the longitudinal direction is a calculated average of width related breaking-force measurements of at least ten samples taken according to DIN EN ISO 1924-2 in the longitudinal direction,
   a maximum average tensile force in the transverse direction is a calculated average of width related breaking-force measurements of at least ten samples taken according to DIN EN ISO 1924-2 in the transverse direction,
   wherein said two support layers have different average maximum tensile forces in longitudinal or transverse directions,
   wherein the average maximum tensile force of the support layer absorbing the transverse forces is>10 N in longitudinal direction, and
   the average maximum tensile force of the support layer absorbing the transverse forces is>20 N in the transverse direction.

3. The filter medium according to claim 1, wherein
   a maximum average tensile force in the longitudinal direction is a calculated average of width related breaking-force measurements of at least ten samples taken according to DIN EN ISO 1924-2 in the longitudinal direction,
a maximum average tensile force in the transverse direction is a calculated average of width related breaking-force measurements of at least ten samples taken according to DIN EN ISO 1924-2 in the transverse direction,
wherein said two support layers have different average maximum tensile forces in longitudinal or transverse directions,
wherein the average maximum tensile force of the support layer absorbing the longitudinal forces is>20 N in longitudinal direction,
wherein the average maximum tensile force of the support layer absorbing the longitudinal forces is>10 N in transverse direction.

4. The filter medium according to claim 1, wherein
the width-related bending stiffness of the support layer absorbing the transverse forces is>0.1 N mm in longitudinal direction, and
wherein the width-related bending stiffness of the support layer absorbing the transverse forces is>0.3 N mm in transverse direction.

5. The filter medium according to claim 1, wherein
the width-related bending stiffness of the support layer absorbing the longitudinal forces is>0.3 N mm in longitudinal direction, and
the width-related bending stiffness of the support layer absorbing the longitudinal forces is>0.1 N mm, in transverse direction.

6. The filter medium according to claim 1, wherein
the thread angle of the support layer responsible for absorbing the longitudinal forces is in the range of 40 degrees to 80 degrees.

7. The filter medium according to claim 1, wherein
the prefilter stage is formed of a meltblown layer having a thickness in the range of 0.1 mm to 1 mm and a weight per surface area in the range of 40 g/m$^2$ to 200 g/m$^2$.

8. The filter medium according to claim 7, wherein
the thickness of the meltblown layer is between 0.2 mm and 0.4 mm and the weight per surface area is between 90 g/m$^2$ and 110 g/m$^2$.

9. The filter medium according to claim 1, wherein
fiber diameter of the prefilter layer and/or of the fine filter layer is in the range of 0.1 mm to 10 mm.

10. The filter medium according to claim 1, wherein
the prefilter layer and/or the fine filter layer are selected from the group consisting of polybutylene terephthalate (PBT) meltblown, polyamide (PA) meltblown, polypropylene (PP) meltblown, and polyether sulfone (PES) meltblown.

11. The filter medium according to claim 1, wherein
the fine filter layer is formed of a meltblown layer with a thickness in the range of 0.5 mm to 1.5 mm and a weight per surface area in the range of 40 g/m$^2$ to 200 g/m$^2$.

12. The filter medium according to claim 11, wherein
the thickness of the meltblown layer is between 0.6 mm and 1.4 mm and the weight per surface area is between 90 g/m$^2$ and 110 g/m$^2$.

13. The filter medium according to claim 1, wherein
the filter medium comprises additionally a third filter layer.

14. The filter medium according to claim 13, wherein
the third filter layer is formed of a meltblown layer having a thickness in the range of 0.1 mm to 1 mm and a weight per surface area in the range of 10 g/m$^2$ to 100 g/m$^2$,
wherein the third filter layer is selected from the group consisting of polybutylene terephthalate (PBT) meltblown, polyamide (PA) meltblown, polypropylene (PP) meltblown, and polyether sulfone (PES) meltblown.

15. The filter medium according to claim 14, wherein
the fiber diameter of the third filter layer is in the range of 0.1 mm to 10 mm,
wherein the third filter layer is embodied as an absolute separator.

16. The filter medium according to claim 1, wherein
said transverse force absorbing layer has a grid of square cells, each grid cell having four equal length sides.
wherein said longitudinal force absorbing layer has a grid of rhombus cells, each grid cell having four equal length sides with the no right angles between adjacent sides, the thread angles chosen such that the rhombus cells are longer in the longitudinal direction than in the transverse direction.

17. The filter medium according to claim 16, wherein
wherein cell sides of said support layers are not parallel to either of the longitudinal and transverse directions.

18. The filter medium according to claim 17, wherein
a maximum average tensile force in the longitudinal direction is a calculated average of width related breaking-force measurements of at least ten samples taken according to DIN EN ISO 1924-2 in the longitudinal direction,
a maximum average tensile force in the transverse direction is a calculated average of width related breaking-force measurements of at least ten samples taken according to DIN EN ISO 1924-2 in the transverse direction,
wherein said support layers are grids of molded plastic without metal, and
wherein said support layers have differing average maximum forces in longitudinal or transverse directions.

19. A method for producing a zigzag-shaped folded filter medium of claim 1, comprising:
providing a fine filter layer;
providing a prefilter layer, wherein at least one of the fine filter and prefilter layers comprises a melt blown;
providing a first support layer;
providing a second support layer, wherein said support layers are plastic grids;
stacking said layers face to face on top of each other such that said fine filter layer and said prefilter layer are loosely stacked together on top of each other and together positioned between said support layers;
embossing said stacked layers in an ultrasonic embossing unit to form folding lines for pleats into the stacked layers of the filter medium, wherein said layers are fused together along said folding lines, securing said layers together; and
folding said filter medium along said fold lines into a zigzag folded filter medium.

20. A filter element for removing particles from a fluid flow, comprising:
a first end disk;
a second end disk;
the filter medium according to claim 1, folded into a zigzag folded star shape and having opposing ends of said star-shaped filter medium each embedded into a respective one of said end disks.

* * * * *